2 Sheets—Sheet 1.
E. R. DRAVER.
SIFTING APPARATUS.
No. 11,555. Reissued July 7, 1896.
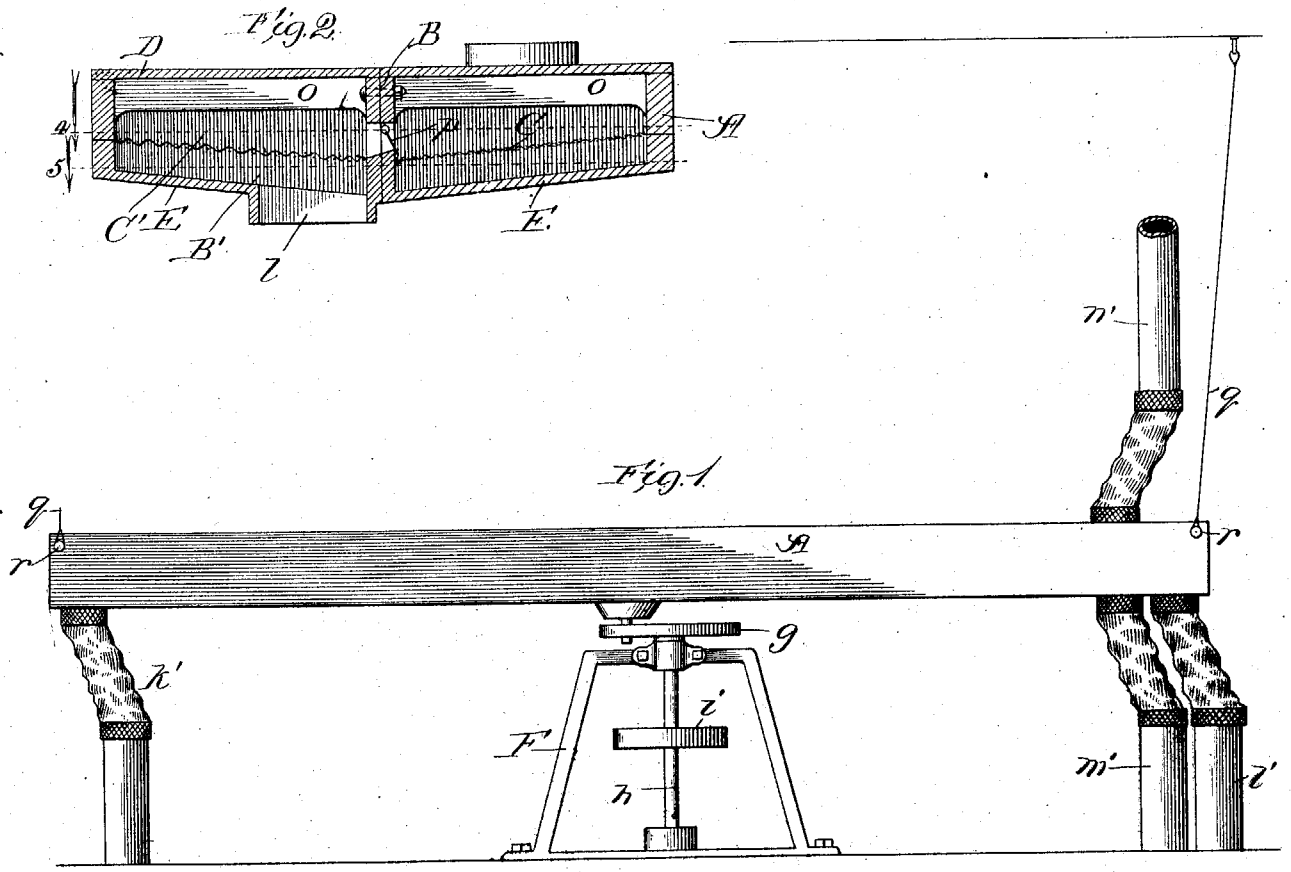
Witnesses:
Chas. E. Gaylord,
Lute J. Miller.
Inventor:
Emil R. Draver.
By Dyrenforth & Dyrenforth,
Attys.

2 Sheets—Sheet 2.
E. R. DRAVER.
SIFTING APPARATUS.
No. 11,555. Reissued July 7, 1896.
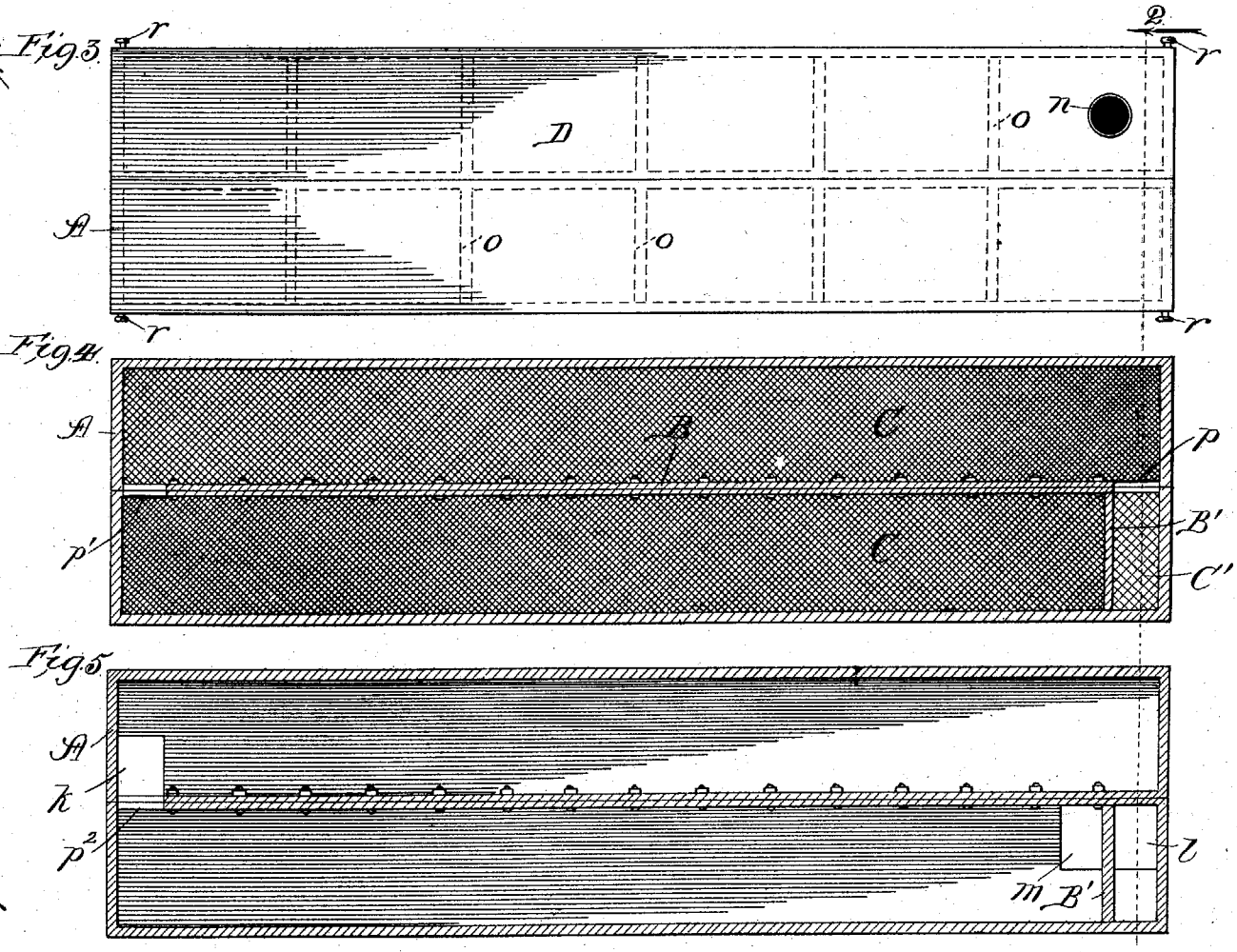
Witnesses:
Chas. E. Gaylord
Lutie J. Kite
Inventor:
Emil R. Draver,
By Dyrenforth & Dyrenforth,
Att'ys.

UNITED STATES PATENT OFFICE.

EMIL R. DRAVER, OF ALLIANCE, NEBRASKA.

SIFTING APPARATUS.

SPECIFICATION forming part of Reissued Letters Patent No. 11,555, dated July 7, 1896.

Original No. 536,781, dated April 2, 1895. Application for reissue filed November 14, 1895. Serial No. 568,995.

*To all whom it may concern:*

Be it known that I, EMIL R. DRAVER, of Alliance, in the county of Boxbutte and State of Nebraska, have invented certain new and useful Improvements in Sifting Apparatus; and I do hereby declare that the following is a full, clear, and exact description of the invention, such as will enable others skilled in the art to which it appertains to make and use the same, reference being had to the accompanying drawings, which form a part of this specification.

My invention relates to an improvement in sifting apparatus which I have particularly designed for use in connection with flour-mills, though it may be useful in other connections for its sifting function.

My objects are to provide an improved construction of the sifting-surface, and also of the conveying-surface of the imperforate bottom of the sifter, by means of which the freedom of motion over these surfaces, respectively, of the material to be sifted and of the sifted material shall be materially enhanced.

According to my improvement I form the sifting apparatus with compartments, one beside the other, having sifting-surfaces inclined downward toward each other, the compartments communicating at or near both ends, whereby, when suitable motion is imparted to the apparatus, a continuous circulation is produced of the coarse particles of the material being sifted, which do not pass through the meshes of the screen; and my improvement also involves constructing the apparatus without obstructions (such as the commonly-provided inclined steps, cross-slats, or baffle-strips, and the like) on the surfaces to the desired freedom of travel of the material, whereby the surfaces are rendered plain and smooth, and the light fluffy material, after it rises, is not stirred up by the action of the sifter, but remains on top until discharged at the proper place.

My invention consists in the general construction of my improved sifting apparatus; and it also consists in details of construction and combinations of parts, all substantially as hereinafter described, and pointed out in the claims.

Referring to the accompanying drawings, Figure 1 represents my improved sifting apparatus by a view in side elevation. Fig. 2 is a section taken at the line 2 on Fig. 3 and viewed in the direction of the arrow; Fig. 3, a plan view of the sifter; Fig. 4, a section taken at the line 4 on Fig. 2 and viewed in the direction of the arrow; and Fig. 5, a section taken at the line 5 on Fig. 2 and viewed in the direction of the arrow.

A is the frame, which is preferably of the oblong rectangular form illustrated, and which should be provided with means for suspending it, (shown as buttons $r$,) provided on opposite sides near the ends of the frame and at which to fasten the cords $q$, or other flexible medium of suspension.

B is a partition extending lengthwise along the center of the frame and provided near its opposite ends with flap-valves or gates $p$ and $p'$, which open in relatively opposite directions, and cover openings in the partition, the bases of which incline upward from one side to the other of the partition, as shown, of the opening in Fig. 2, except that the opening controlled by the valve $p'$, and which is not shown in elevation, inclines in the opposite direction.

From each side of the partition B, at a point near the plane of the bases of the gates, there extends, in the direction of upward inclination toward the opposite sides of the frame, a bolting cloth or screen C; and the frame is provided with a cover D, reinforced by cleats $o$, placed at suitable intervals to extend from each side of the partition B to the adjacent side of the frame.

E is an imperforate bottom below the screen C and inclining correspondingly with the latter, or approximately so.

In the cover D near one end and at one side of the partition B is an inlet-opening $n$ for the material, and to which leads the spout $n'$; and adjacent to the inlet, but at the opposite side of the partition, are the discharge-openings $m$ and $l$, one in advance of the other, both being formed in the bottom E, on which there is a transverse partition B', separating them, and to that end extending perpendicularly between the bottom and the screen C. The opening $l$ is covered by a section of screen C' of somewhat wider mesh than the screen C and on the same plane with the latter; and from the openings $m$ and $l$ there depend, respectively, the discharge-spouts $m'$ and $l'$. I also provide in the bottom E, at the end of the apparatus adjacent to a valve $p^2$, in the partition B, and in the section of the apparatus containing the inlet $n$, a discharge-opening $k$, from which leads the discharge-spout $k'$.

To produce the sifting operation of my improved apparatus, motion has to be imparted to the screen and imperforate bottom surfaces, which motion may be of a gyratory or undulatory or of other suitable character. As means for the purpose I show in Fig. 1 a stand F, in which is journaled an upright rotary shaft $h$, carrying a belt-pulley $i$, and, at its upper end, a crank $g$, engaging the bottom E near its center, the frame A being suspended by the cords $q$ in a manner to produce such engagement.

The material to be sifted is fed through the inlet-spout $n'$ to the screen C, on which there should also be a supply of suitable coarse cleaning material, such as beans, peas, or the like. By setting the shaft $h$ in motion a gyratory motion is imparted to the frame A, and consequently to the screen and imperforate bottom surfaces, causing the material to be sifted to travel from the inlet $n$ toward the opposite end of the apparatus, from which the motion passes it through the gate $p'$ into the section of the apparatus containing the coarser screen C', toward which the motion impels the material, and through which the chaff or refuse drops to the opening $l$ and discharges through the spout $l'$. The cleaning material, being too coarse to pass through the screen-sections C', passes through the gate $p$ into the first section of the apparatus. Thus this coarser cleaning material is in continuous circulation on the screens C C' throughout the operation of the apparatus.

The sifted material, or that which passes through the screen C to the bottom E, is worked along the latter, like the material on the screen, by the motion imparted to the apparatus, and discharges at the opening $k$, through the spout $k'$, while that which is carried, unsifted, with the material through the gate $p'$ is sifted through the screen C in the section of the apparatus provided with the outlet $m$, toward which it is worked and through which it is eventually discharged into the spout $m'$. When it is desired to mix the sifted material from both sides of the partition B, the opening $k$ may be suitably covered, so that the sifted material will pass through the gate $p^2$, Fig. 6, and continue on to the discharge-opening $m$.

The feature of slanting the screen-surface and that of also slanting the imperforate bottom surface in the manner shown and described is of great importance, as thereby the sifting operation and that of working the sifted product toward the discharge-openings in the bottom are greatly enhanced and the efficiency of the apparatus accordingly increased.

The feature of the gate-covered openings in the partition B, provided with the upward-inclined bases, as described, presents the advantage of the bases affording stops at their higher ends to the lower ends of the gates, and that of providing more effectual closure of the gates than if the openings had horizontal bases. Means for producing thoroughly-effective closure by the gates of the openings in the partition are necessary, particularly at the feed end of the apparatus, since the feed-opening and the discharge-opening are at opposite sides of the partition adjacent to an opening therein, and unless such effective closure of the opening were provided the material, or a part thereof, would be liable to pass through it and out through the discharge-opening, instead of over the sifting-surface.

It will be noticed that, as represented in the drawings, the partition B is formed by the adjacent sides of two frames A, bolted together, which construction is preferred in the matter of convenience.

What I claim as new, and desire to secure by Letters Patent, is—

1. In a sifting apparatus, the combination of a frame closed at its ends and having a partition dividing it into sections, openings in the partition toward its opposite ends through which the sections communicate, the opening near the feed end of one section being covered by a gate opening into that section, screen bottoms in the sections, a collecting-bottom under the screen, provided with a discharge-outlet, and means for imparting motion to the apparatus, substantially as described.

2. In a sifting apparatus, the combination of a frame closed at its ends and having a longitudinal partition dividing it into sections and containing, near its ends openings provided with oppositely-opening gates, inclining screens affording sifting-surfaces in said sections and extending between the opposite sides of the frame and those of the partition below the plane of said openings, an inclined bottom on the frame below each screen, provided with a discharge-opening; and means for imparting motion to the frame, substantially as and for the purpose set forth.

3. In a sifting apparatus, the combination of a frame closed at its ends and having a longitudinal partition dividing it into sections and containing, near its ends, openings provided with oppositely-opening gates, inclining screens affording sifting-surfaces in said sections and extending between the opposite sides of the frame and those of the partition below the plane of said openings, an inclined bottom on the frame below each screen extending between a side of the frame and the adjacent side of said partition, and provided with a discharge-outlet, a partition adjacent to said discharge-opening extending between a side of the frame and the longitudinal partition, said base having a chaff-discharge opening adjacent to an opening in said longitudinal partition and on the opposite side of said transverse partition and covered by a coarse-mesh section of the screen, and means for imparting motion to the frame, substantially as and for the purpose set forth.

4. In a sifting apparatus having the parallel sifting-sections divided by a longitudinal partition, openings in the partition at opposite sides of its longitudinal center above the planes of said sifting-surfaces and provided with gates opening in opposite directions, the bases of at least one of said openings inclining upward from one side to the other of the partition and affording a stop for its gate, substantially as and for the purpose set forth.

5. In a sifting apparatus, the combination of a frame closed at its ends and having a longitudinal partition dividing it into sections and containing, near its opposite ends openings provided with oppositely-opening gates, the bases of said openings inclining upward, respectively in opposite directions from one side to the other of the partition and affording stops for the gates, inclining screens affording sifting-surfaces in said sections and extending between the opposite sides of the frame and those of the partition below the plane of said openings, an inclined bottom on the frame below each screen, provided with a discharge-opening, and means for imparting motion to the frame, substantially as and for the purpose set forth.

6. In a sifting apparatus, the combination of a covered frame A having a longitudinal partition B dividing it into sections and containing valves $p$ and $p'$, an inclining screen C in the frame and an inclined imperforate bottom E under said screen containing a discharge-opening $k$ near one end and discharge-openings $m$ and $l$ near its opposite end, separated by a partition B', a coarser screen C' over the opening $l$, an inlet-opening $n$ in the cover, and means for imparting motion to the frame, the whole being constructed and arranged to operate substantially as described.

EMIL R. DRAVER.

In presence of—
H. V. SCHAUPP,
H. C. DRAVER.